US012786654B2

(12) United States Patent
Wang et al.

(10) Patent No.: US 12,786,654 B2
(45) Date of Patent: Nov. 3, 2026

(54) AR GLASSES AND AUDIO ENHANCING METHOD AND DEVICE THEREFOR, AND READABLE STORAGE MEDIUM

(71) Applicant: Goertek Inc., Weifang (CN)

(72) Inventors: Wen Wang, Shandong (CN); Yufeng Li, Shandong (CN); Jiaming Li, Shandong (CN)

(73) Assignee: Goertek Inc., Weifang (CN)

( * ) Notice: Subject to any disclaimer, the term of this patent is extended or adjusted under 35 U.S.C. 154(b) by 0 days.

(21) Appl. No.: 19/113,078

(22) PCT Filed: Aug. 8, 2023

(86) PCT No.: PCT/CN2023/111770
§ 371 (c)(1),
(2) Date: Mar. 19, 2025

(87) PCT Pub. No.: WO2024/066751
PCT Pub. Date: Apr. 4, 2024

(65) Prior Publication Data

US 2026/0095711 A1 Apr. 2, 2026

(30) Foreign Application Priority Data

Sep. 30, 2022 (CN) ......................... 202211211572.5

(51) Int. Cl.
*H04S 7/00* (2006.01)
*G02B 27/01* (2006.01)
*G06F 3/01* (2006.01)

(52) U.S. Cl.
CPC ............ *H04S 7/30* (2013.01); *G02B 27/0172* (2013.01); *G06F 3/013* (2013.01); *G02B 2027/0178* (2013.01); *H04R 2499/15* (2013.01)

(58) Field of Classification Search
CPC .................. H04S 7/30; G02B 27/0172; G02B 2027/0178; G06F 3/013; H04R 2499/15
See application file for complete search history.

(56) References Cited

U.S. PATENT DOCUMENTS

2016/0080874 A1 3/2016 Fullam
2018/0343517 A1* 11/2018 Usher .................... H04R 3/005
(Continued)

FOREIGN PATENT DOCUMENTS

CN 102116941 A * 7/2011
CN 112986914 A 6/2021
(Continued)

OTHER PUBLICATIONS

CN-102116941-A; Jul. 6, 2011; Gao, Chen-fei; (English Translation).*
(Continued)

*Primary Examiner* — Ricardo Osorio
(74) *Attorney, Agent, or Firm* — BAKER BOTTS LLP

(57) ABSTRACT

The present disclosure provides AR glasses, an enhancing method and device therefor, as well as a readable storage medium. The audio enhancing method for AR glasses worn by a user in a surrounding environment, includes: detecting a distribution of sound sources in the surrounding environment a microphone array; marking a position of each sound source in the distribution of sound sources on lenses of the AR glasses; locking onto one of the distribution of sound sources as a target sound source based on an eye gazing direction of the user, extracting and enhancing an audio component associated with a voiceprint characteristic of the target sound source from an audio signal received by the microphone array, configured to obtain an enhanced audio signal; and outputting the enhanced audio signal to the user through an in-ear headphone.

9 Claims, 11 Drawing Sheets

(56) References Cited

U.S. PATENT DOCUMENTS

| | | | | |
|---|---|---|---|---|
| 2018/0365898 | A1* | 12/2018 | Costa | G06F 3/012 |
| 2021/0281956 | A1 | 9/2021 | Nagar et al. | |

FOREIGN PATENT DOCUMENTS

| | | | | | |
|---|---|---|---|---|---|
| CN | 115079833 | A | * | 9/2022 | G10L 15/26 |
| CN | 116126132 | A | | 5/2023 | |
| CN | 116418949 | A | * | 7/2023 | H04N 7/18 |
| WO | WO-2023081574 | A1 | * | 5/2023 | G06F 3/017 |

OTHER PUBLICATIONS

CN-115079833-A; Sep. 20, 2022; Liu, Tian-yi; (English Translation).*

CN-116418949-A; Jul. 11, 2023; Liu, Wei; (English Translation).*

WO-2023081574-A1; May 11, 2023; Du Ruofei; (English Translation).*

* cited by examiner

AR GLASSES AND AUDIO ENHANCING METHOD AND DEVICE THEREFOR, AND READABLE STORAGE MEDIUM

CROSS-REFERENCE TO RELATED APPLICATIONS

The present disclosure is a National Stage of International Application No. PCT/CN2023/111770, filed on Aug. 8, 2023, which claims priority to a Chinese patent application No. 202211211572.5 filed with the CNIPA on Sep. 30, 2022 and entitled "AR GLASSES AND AUDIO ENHANCING METHOD AND DEVICE THEREFOR, AND READABLE STORAGE MEDIUM", both of which are hereby incorporated by reference in their entireties.

TECHNICAL FIELD

The present disclosure relates to the technical field of Augmented Reality (AR), and particularly to an AR glasses and audio enhancing method and device therefor, as well as a readable storage medium.

BACKGROUND

AR technology leverages computers to generate realistic virtual information encompassing visual, auditory, force, haptic, and kinesthetic sensations. This virtual information is overlaid onto the real world, enabling interaction between people and virtual information.

AR glasses, based on AR technology, allow wearers not only to perceive real-world objects, but also to visualize generated virtual objects as if they are part of the real world. In addition to visual augmentation, AR glasses allow the wearers to capture ambient sounds from the surrounding real world through a plurality of microphones, and even enhance the real world experience with virtual audio.

In noisy environments with a plurality of sound sources in the real world, the wearers of AR glasses may wish to focus on the sound from one or a few specific sound sources while ignoring others. Although directional microphones can be employed to prioritize capturing sound from a real sound source in a specific direction and/or at a specific distance while suppressing noise from sound sources at other locations, the direction and/or distance of the directional microphone with the maximum sensitivity to the sound source does not necessarily correspond to the direction and/or distance that the user is interested in. Consequently, there is a need for assisting the wearer of AR glasses in better capturing the sound from the sources they are interested in.

SUMMARY

An embodiment of the present disclosure provides an AR glasses and an audio enhancing method and device for it, and a readable storage medium, which aim to assist a wearer of the AR glasses in better acquiring the sound of the sound source he is interested in.

According to a first aspect of the present disclosure, an audio enhancing method for AR glasses is provided, which includes:

using a microphone array to detect distribution of sound sources in real world around a wearer of the AR glasses;

marking a position of each detected sound source on lenses of the AR glasses;

locking onto a target sound source based on an eye gazing direction of the wearer of the AR glasses;

extracting and enhancing an audio component associated with a voiceprint characteristic of the target sound source from an audio signal received by the microphone array; and outputting an enhanced audio signal to the wearer of the AR glasses through an in-ear headphone.

According to a second aspect of the present disclosure, an audio enhancing device for AR glasses is provided, which includes:

a sound source distribution detecting unit configured for using a microphone array to detect distribution of sound sources in real world around a wearer of the AR glasses;

a sound source position marking unit configured for marking a position of each detected sound source on lenses of the AR glasses;

a target sound source locking unit configured for locking onto a target sound source based on an eye gazing direction of the wearer of the AR glasses;

an audio enhancing unit configured for extracting and enhancing an audio component associated with a voiceprint characteristic of the target sound source from an audio signal received by the microphone array; and an audio outputting unit configured for outputting an enhanced audio signal to the wearer of the AR glasses through an in-ear headphone.

According to a third aspect of the present disclosure, an AR glasses is provided, which includes a microphone array, an eye tracker, an in-ear headphone, a memory, and a processor, wherein the memory stores computer programs which are loaded and executed by the processor to implement the above audio enhancing method for AR glasses.

According to a fourth aspect of the present disclosure, a readable storage medium storing one or more computer programs is provided, wherein the one or more computer programs, when executed by a processor, implement the proceeding audio enhancing method for AR glasses.

The solutions provided by the embodiments of the present disclosure can achieve the following beneficial effects:

In noisy environments with a plurality of sound sources in the real world, the AR glasses and the audio enhancing method and device therefor, as well as the readable storage medium provided by the embodiments of the present disclosure, achieve enhanced directional audio by optimally amplifying the sound from sound sources located in the vicinity of the eye gazing direction of the wearer of AR glasses while suppressing and eliminating sounds from sound sources in other areas. This assists the wearer of AR glasses in better capturing the sound from the sound source they are interested in and reduces interference from other sound sources. The result is a noticeable noise-reducing effect, improved the user experience for the wearer of AR glasses, and the true realization of AR glasses' role in augmenting reality.

BRIEF DESCRIPTION OF THE DRAWINGS

In order to more clearly illustrate the solution in the embodiments of the present disclosure, accompanying drawings that need to be used in description of the embodiments will be briefly introduced as follows. It is evident that drawings in following description are only some embodiments of the present disclosure. For those skilled in the art, other drawings can also be obtained according to the disclosed drawings. In the figures.

DETAILED DESCRIPTION

The following description provides a more detailed explanation of the embodiments of the present disclosure with reference to the accompanying drawings. These embodiments are provided to enable a thorough understanding of the present disclosure and to fully convey the scope of the disclosure to those skilled in the art. Although exemplary embodiments of the present disclosure are illustrated in the accompanying drawings, it should be understood that the present disclosure can be implemented in various forms and should not be limited by the embodiments described herein.

Figure 1:
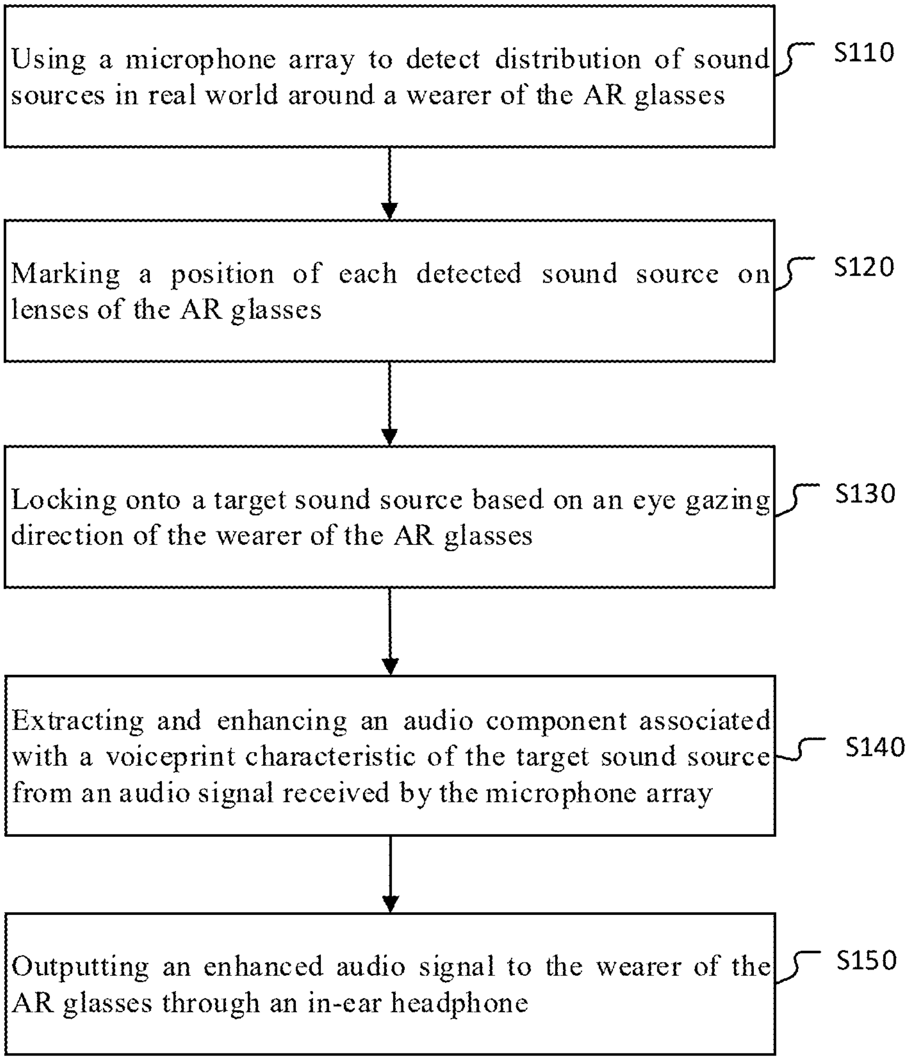
FIG. 1 is a schematic flow diagram of an audio enhancing method for AR glasses provided by an embodiment of the present disclosure.

An embodiment of the present disclosure provides an audio enhancing method for AR glasses. FIG. 1 is a schematic flow diagram of an audio enhancing method for AR glasses provided by an embodiment of the present disclosure. As shown in FIG. 1, it includes steps S110 to S150:

Step S110: using a microphone array to detect distribution of sound sources in real world around a wearer of the AR glasses.

This step is based on the principle of binaural localization, which utilizes a microphone array composed of a plurality of microphones provided on the AR glasses to detect the distribution of sound sources in the real world around the wearer of the AR glasses.

The binaural localization refers to the ability of binaural hearing to determine the orientation of a sound source. When a sound source emits sound from different positions relative to the listener, the intensity and timing of the sound waves reaching the listener's ears differ. The auditory system uses this information to determine the position of the sound source. Similarly, the position of a sound source can be determined by calculating the sound source information obtained from a microphone array composed of two or more microphones. Below, the principle of determining the sound source position is explained using a microphone array composed of four microphones as an example.

Figure 2:
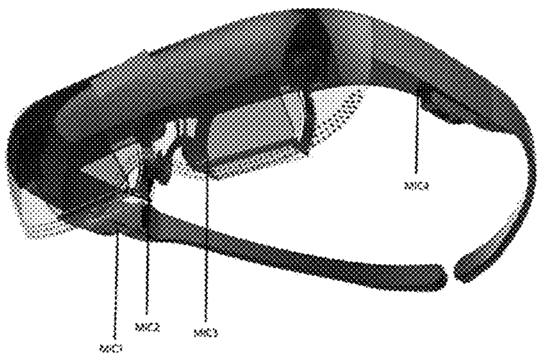
FIG. 2 is a schematic diagram showing possible positions of four microphones provided on AR glasses.

FIG. 2 is a schematic diagram showing possible positions of four microphones provided on AR glasses. It should be understood that the number of microphones provided on the AR glasses is not limited to four, nor is it limited to the position arrangement shown in FIG. 2. Generally, the more microphones that constitute the microphone array and the more symmetrical their arrangement, the more accurately the sound source position can be determined.

Figure 3:
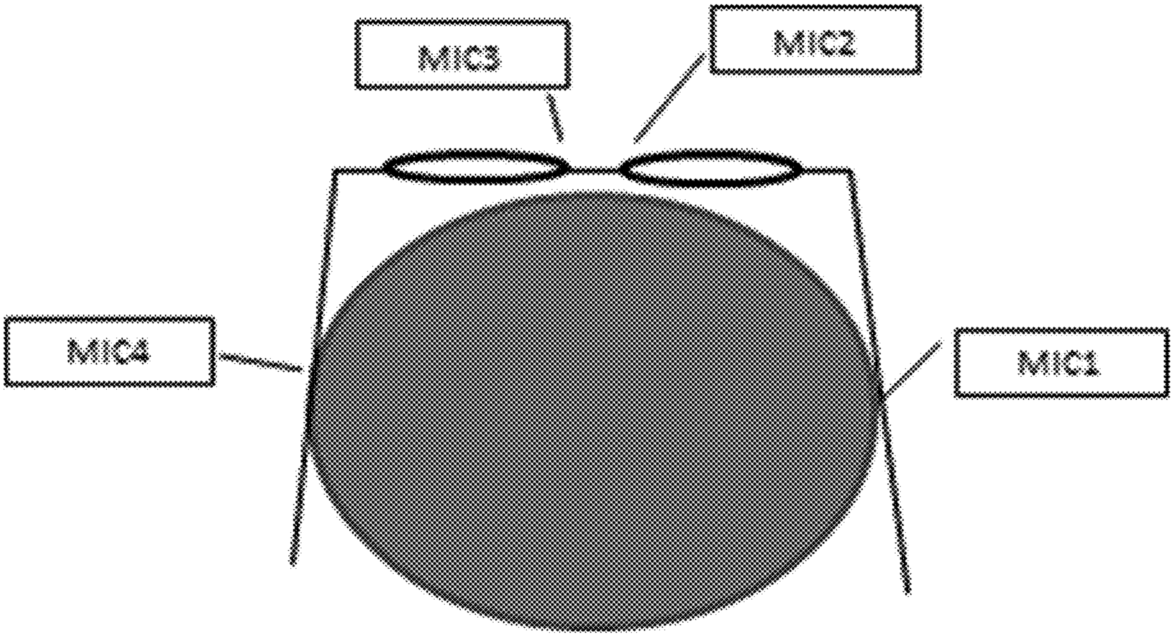
FIG. 3 is a schematic diagram showing the positions of the four microphones shown in FIG. 2 when the AR glasses are worn.
Figure 4:
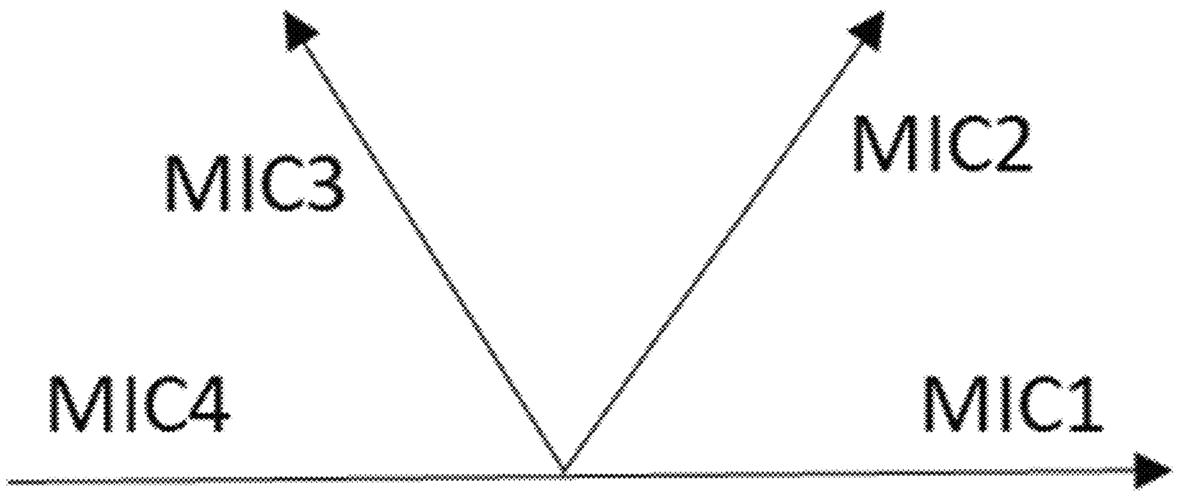
FIG. 4 is a schematic diagram showing the planar positions of the four microphones shown in FIG. 3.

FIG. 3 is a schematic diagram showing the positions of the four microphones shown in FIG. 2 when the AR glasses are worn. FIG. 4 is a schematic diagram showing the planar positions of the four microphones shown in FIG. 3.

Figure 5:
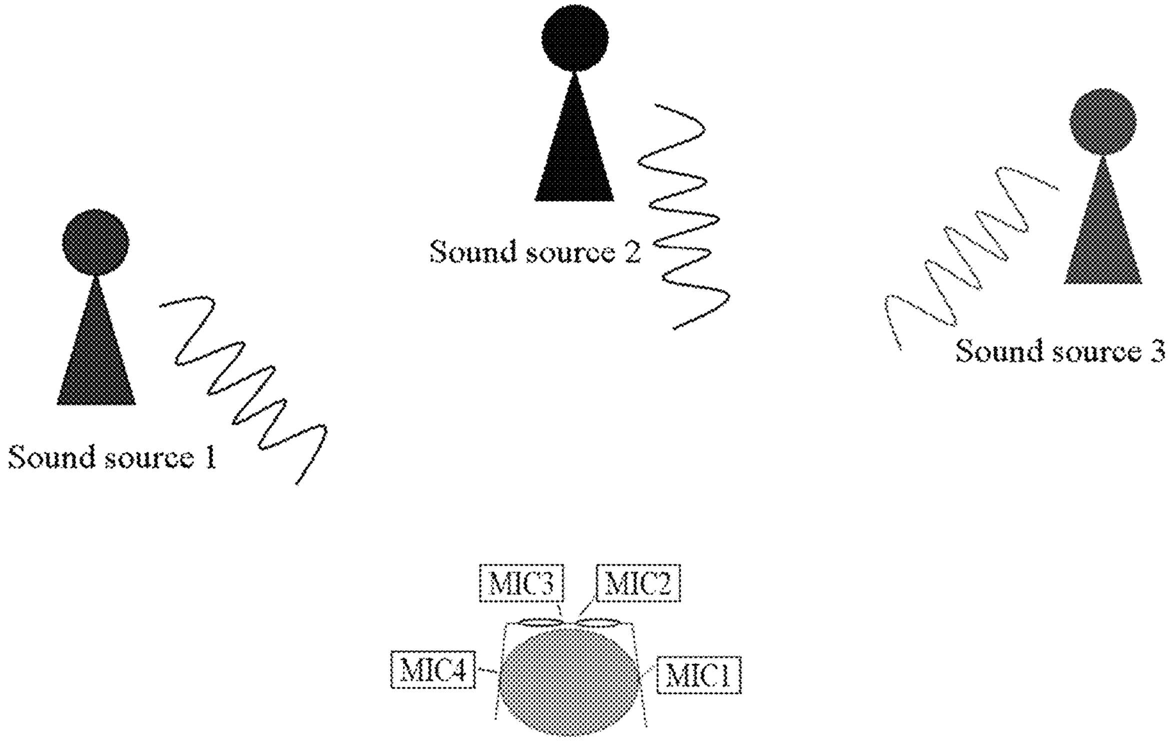
FIG. 5 is a schematic diagram showing the distribution of three sound sources around the wearer of AR glasses.
Figure 6:
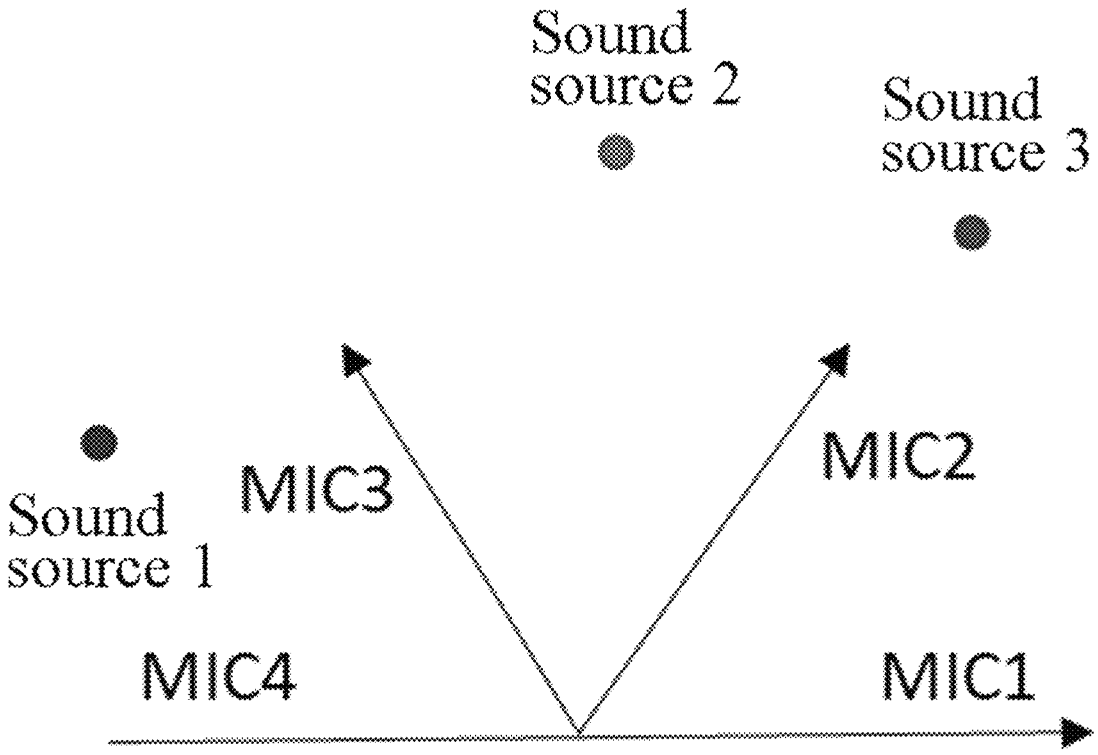
FIG. 6 is a schematic diagram showing the planar positions of the three sound sources shown in FIG. 5.

It is assumed that there are three sound sources in the real world around the wearer of the AR glasses, and the distribution of the sound sources is as shown in FIG. 5. FIG. 5 is a schematic diagram showing the distribution of three sound sources around the wearer of AR glasses. FIG. 6 is a schematic diagram showing the planar positions of the three sound sources shown in FIG. 5.

When the wearer of the AR glasses is at the first position, the first direction line for each sound source can be obtained based on the sound signals of different intensities picked up by each microphone in the microphone array.

Figure 7:
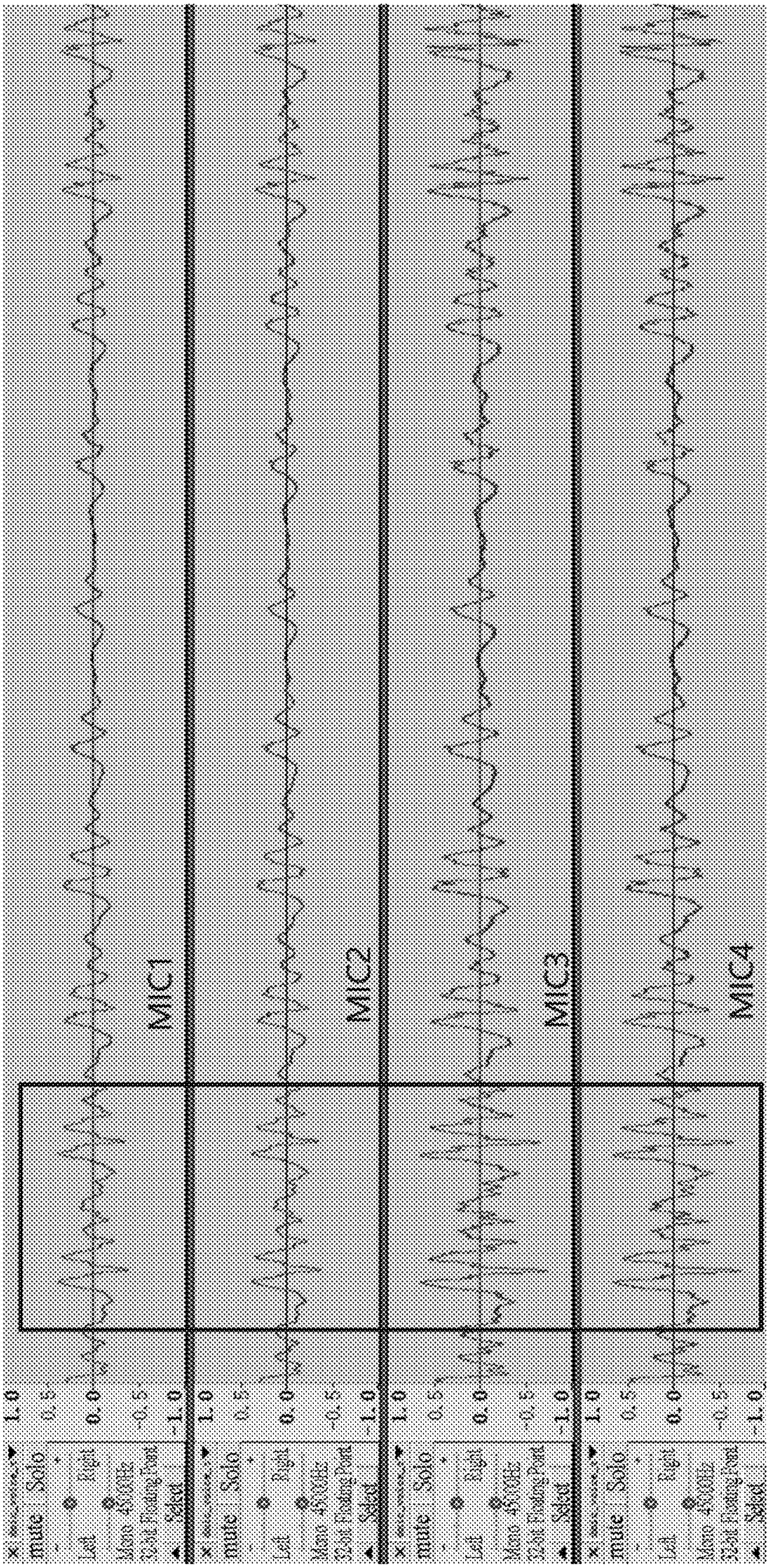
FIG. 7 is a schematic diagram of the waveform of the sound signal picked up by four microphones (MIC1~4) when the sound source 1 is emitting sound alone in the scenario shown in FIG. 6.

Taking the scenario shown in FIG. 6 as an example, FIG. 7 is a schematic diagram of the waveform of the sound signal picked up by four microphones (MIC1~4) when the sound source 1 is emitting sound alone in the scenario shown in FIG. 6. When the sound source 1 emits sound alone, the four microphones (MIC1~4) can pick up sound signals of different intensities, and the waveforms of the sound signals picked up by the four microphones are shown in FIG. 7. By comparing the intensity of the sound signals, the direction of the sound source can be located.

It can be seen from FIG. 7 that the intensity of the sound signal picked up by MIC3 and MIC4 is greater than that picked up by MIC1 and MIC2, allowing a preliminary judgment on the general position of the sound source 1. Then based on the slight differences between MIC3 and MIC4, the first direction line of the sound source 1 in the coordinate system of MIC3 and MIC4 can be precisely determined.

Even in scenarios where a plurality of sound sources emitting sound simultaneously, the first direction line of each sound source relative to the position where the wearer of the AR glasses is located can still be acquired by combining the microphone array sound source localization algorithms. These algorithms include time delay of arrival-based sound source localization algorithms, high-resolution spectral estimation-based sound source localization algorithms, or beamforming-based sound source localization algorithms, etc.

When the wearer of the AR glasses moves to the second position, according to the sound signals of different intensities picked up by each microphone in the microphone array, the second direction line for each sound source can be obtained based on the same localization algorithm or principle. Subsequently, according to the position of the intersection point of the first and second direction lines for each sound source, the position of each sound source can be determined.

Figure 8:
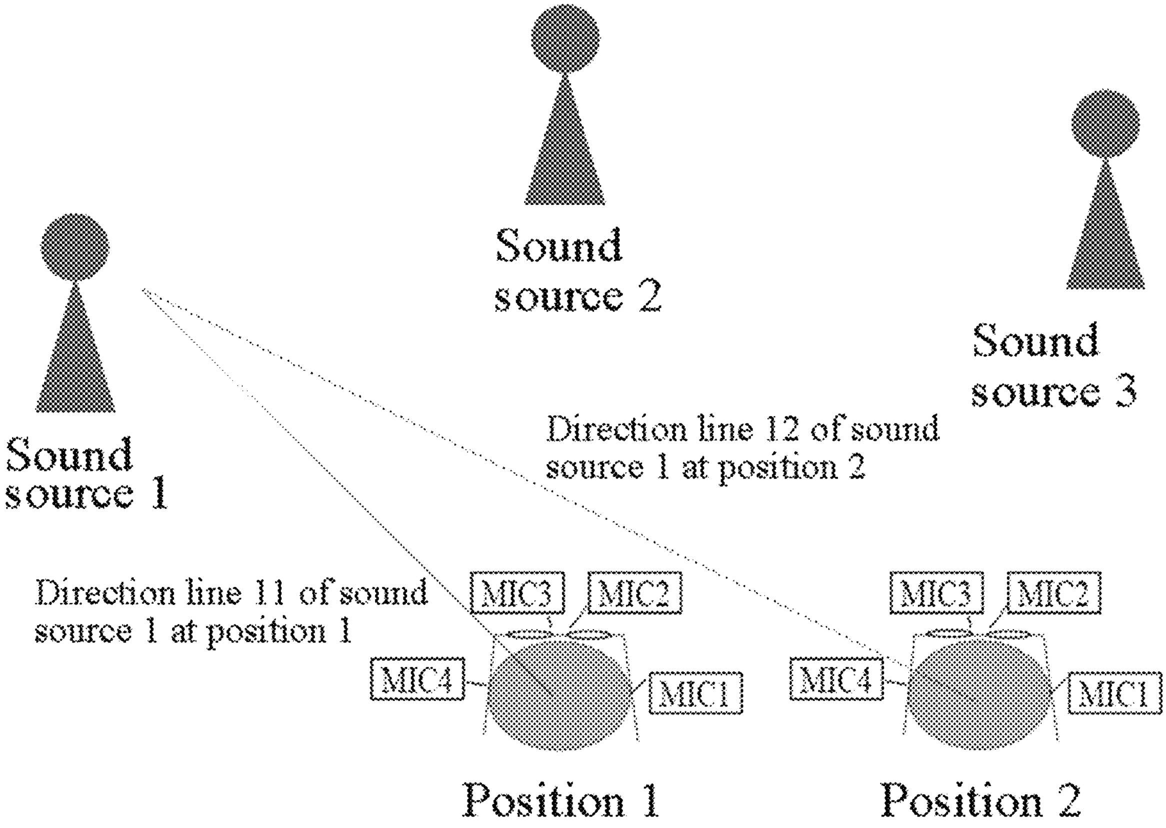
FIG. 8 is a schematic diagram showing how the wearer of AR glasses determines the position of a sound source through movement of the position in the scenario shown in FIG. 6.

FIG. 8 is a schematic diagram showing how the wearer of AR glasses determines the position of a sound source through movement of the position in the scenario shown in FIG. 6. As shown in FIG. 8, when the wearer of the AR glasses is at the position 1, the direction line 11 of the sound source 1 relative to the position 1 can be acquired. When the wearer of the AR glasses is at the position 2, the direction line 12 of the sound source 1 relative to the position 2 can be acquired. By calculating the position of the intersection point of the two direction lines 11 and 12, the position of the sound source 1 can be determined.

By using the above method, the position of each detected sound source can be determined, thereby obtaining the distribution of sound sources in the real world around the wearer of the AR glasses.

Figure 9:
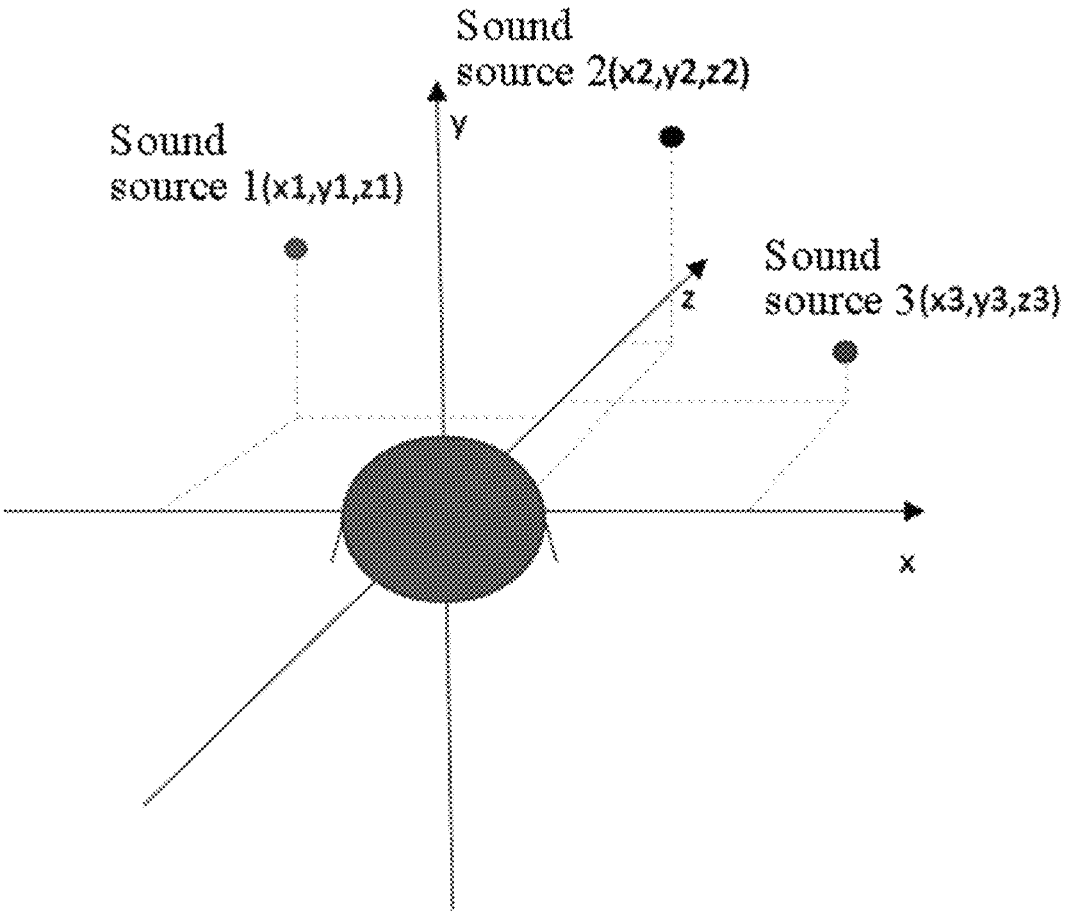
FIG. 9 is a schematic diagram showing the coordinate positions of three sound sources around the wearer of AR glasses in the world coordinate system.

Step S120, marking a position of each detected sound source on lenses of the AR glasses. This step S120 can be specifically as follows:

First, establish a world coordinate system with the head center of the wearer of the AR glasses as the coordinate origin. The coordinate position of each detected sound source in the world coordinate system can be represented by (x, y, z) coordinates. Taking the scenario of three sound sources in the real world around the wearer of the AR glasses as an example. FIG. 9 is a schematic diagram showing the coordinate positions of three sound sources around the wearer of AR glasses in the world coordinate system.

Next, establish a camera coordinate system with a pupil of the wearer of the AR glasses as a coordinate origin, and converting the coordinate of each detected sound source in the world coordinate system into a coordinate in the camera coordinate system according to a conversion formula obtained from a camera calibration algorithm.

Figure 10:
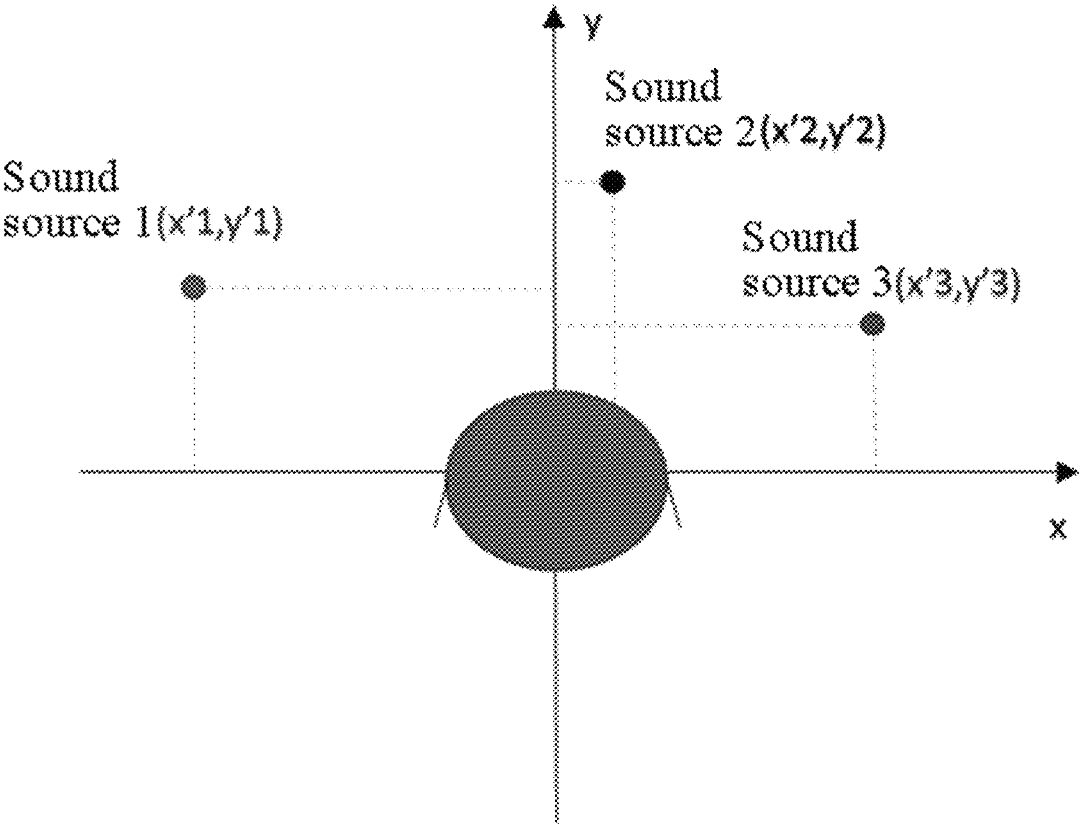
FIG. 10 is a schematic diagram showing the conversion of the three sound sources shown in FIG. 9 into coordinate positions in the camera coordinate system.

The established camera coordinate system is a planar coordinate system, and the coordinate position of each detected sound source in the camera coordinate system can be represented by (x, y) coordinates. FIG. 10 is a schematic diagram showing the conversion of the three sound sources shown in FIG. 9 into coordinate positions in the camera coordinate system.

Then, the coordinate position of each detected sound source in the camera coordinate system is marked on the lenses of the AR glasses using a first marking method.

Figure 11:
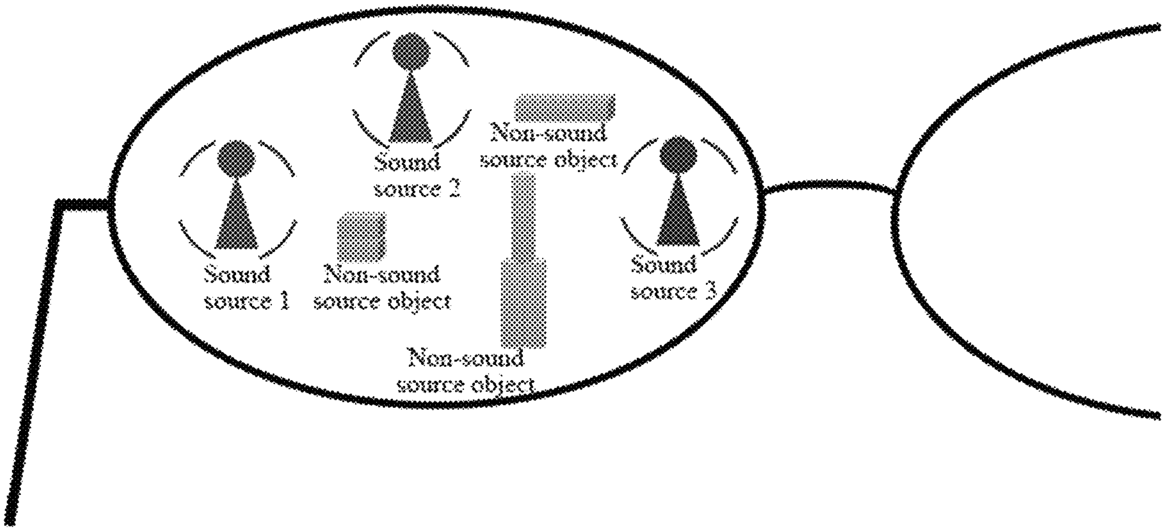
FIG. 11 is a schematic diagram of marking the positions of sound sources on the lenses of AR glasses according to an embodiment of the present disclosure.

There are various ways to mark the sound source positions on the lenses of the AR glasses. FIG. 11 is a schematic diagram of marking the positions of sound sources on the lenses of AR glasses according to an embodiment of the present disclosure. The marking method shown in FIG. 11 is to display a circular dotted line box with a set radius (e.g., 2 cm) centered on the coordinate position of the sound source in the camera coordinate system, so as to mark the position of each detected sound source on the lenses of the AR glasses. Of course, the dotted line box can also be highlighted with colors such as red or yellow, and the circular box can be designed as a triangle, a square, or an ellipse.

Step S130, locking onto a target sound source based on an eye gazing direction of the wearer of the AR glasses.

This step S130 can be specifically described as follows: using an eye tracker to obtain the eye gazing direction of the wearer of the AR glasses and converting the eye gazing direction into a coordinate in the camera coordinate system. When a distance between the eye gazing direction and a coordinate of a sound source in the camera coordinate system is less than a preset distance value, determining the sound source as the target sound source. Then, distinctly marking the target sound source on the lenses of the AR glasses by using a second marking method different from the first marking method, thereby locking onto the target sound source.

The eye tracker uses eye-tracking technology to track eye movements, locate the pupil position and obtain the center coordinates of the pupil through image processing technology. It then calculates the gazing point by using corresponding algorithms.

Figure 12:
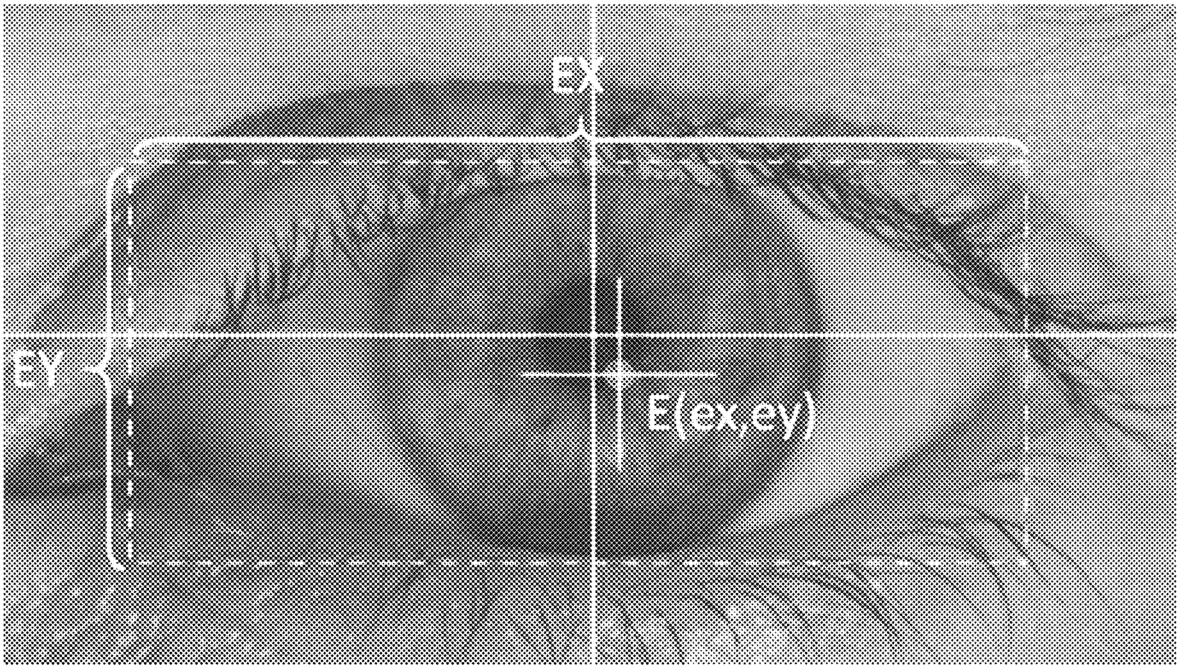
FIG. 12 is a schematic diagram illustrating the principle of using an eye tracker to obtain the eye gazing direction.

By using the eye tracker, it is possible to acquire the eye gazing direction of the wearer of the AR glasses. FIG. 12 is a schematic diagram illustrating the principle of using an eye tracker to obtain the eye gazing direction. As shown in FIG. 12, when the pupil moves from the origin O(0,0) of the eye coordinate system to point E(ex,ey), the direction vector of line OE can be calculated, which represents the eye gazing direction of the wearer of the AR glasses.

It should be noted that the eye coordinate system can also be established with the wearer's pupil as the coordinate origin, making it identical to the camera coordinate system. In computer graphics, the eye coordinate system is a right-handed orthonormal coordinate system, with the eye interpreted as looking towards the negative Z-axis of this coordinate system while taking a photograph.

For a camera lens display range of 1920×1080, when the pupil moves from the origin O(0,0) of the eye coordinate system to point E(ex,ey), the eye gazing direction OE can be converted into coordinates C(cx,cy) in the camera coordinate system by using the following formula:

$$\begin{cases} cx = (ex * 1920)/EX \\ cy = (ey * 1080)/EY \end{cases}$$

Herein, EX and EY are respectively assigned the values corresponding to the length and width dimensions of the human eye. Under normal circumstances, these two values are default statistical values.

When $\sqrt{(x'-c_x)^2+(y'-c_y)^2}<m$, that is, when the distance between the eye gazing direction and the coordinate of a sound source in the camera coordinate system is less than the preset distance value m, it can be considered that the gazing point coordinate falls within the range of the sound source, that the wearer of the AR glasses is looking in the direction of the sound source, that the sound source is determined as the target sound source, and that all other sound sources that are not being gazed at are determined as non-target sound sources. It can be understood that by reducing the value of m, it is possible to improve the accuracy of determining the target sound source.

Once the target sound source is determined, it can be distinctly marked on the lenses of the AR glasses to lock onto the target sound source.

Figure 13:
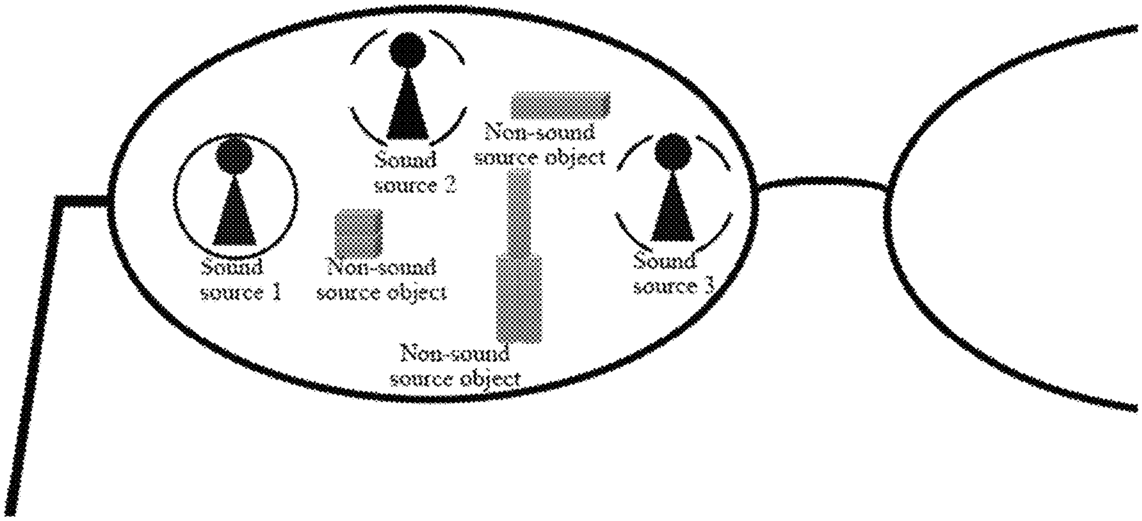
FIG. 13 is a schematic diagram of distinctly marking the target sound source on the lenses of AR glasses according to an embodiment of the present disclosure.

FIG. 13 is a schematic diagram of distinctly marking the target sound source on the lenses of AR glasses according to an embodiment of the present disclosure. By comparing FIG. 11 and FIG. 13, the position of the sound source 1 is marked with a solid circular frame, while the positions of the other two sound sources are still marked with dashed circular frames. That is, by transforming the dashed frame into the solid frame, the sound source 1 is distinctly marked, thereby locking the sound source 1 as the target sound source. Of course, other methods such as different colors or shapes can also be used to distinguish the target sound source from the unselected sound sources.

Step S140, extracting and enhancing an audio component associated with a voiceprint characteristic of the target sound source from an audio signal received by the microphone array.

This Step S140 can be specifically implemented as: looking up the voiceprint database to obtain a voiceprint characteristic of the target sound source according to the coordinate of the target sound source in the camera coordinate system; extracting an audio component associated with the voiceprint characteristics of the target sound source from an audio signal currently received by the microphone array; amplifying a gain of the extracted audio component, and/or reducing or turning off a gain of other unextracted audio components.

The voiceprint is the sound wave spectrum carrying speech information displayed by electroacoustic instruments, and is a biometric feature composed of more than a hundred characteristic dimensions such as wavelength, frequency, and intensity, which has the characteristics of stability, measurability, and uniqueness.

In order to obtain the voiceprint characteristic of the target sound source, it is necessary to perform the following steps after Step S110 and before Step S140: extracting voiceprint characteristics for each detected sound source separately, and associating the voiceprint characteristics with corresponding sound source positions to establish a voiceprint database.

That is, in addition to locating each detected sound source, the sound signal is also recorded, and the voiceprint characteristic of each sound source is extracted. The voiceprint characteristic of each sound source is associated with its corresponding sound source position to establish a voiceprint database, so that the voiceprint of a specific sound source can be extracted from the mixed sound signals in the future.

There are already various technologies or methods to extract the voiceprint of a target sound source in a multi-sound source environment. Therefore, extracting the voiceprint characteristic for each detected sound source is not the focus of the present disclosure, and it can be implemented using various existing technologies.

By associating the voiceprint characteristic of each sound source with its sound source position, the established voiceprint database can be saved in the form of an array with the sound source as the index. After locking onto the target sound source, the voiceprint characteristic of the target sound source can be acquired by looking up the voiceprint database according to the coordinate position of the target sound source in the camera coordinate system. For example, if the sound source number is determined to be 1 according to the coordinate position of the target sound source in the camera coordinate system, the corresponding voiceprint characteristic of the sound source number 1 can be found in the voiceprint database.

Then, based on the voiceprint characteristic of the target sound source, the audio signal from the microphone array can be processed to extract the audio component associated with the voiceprint characteristic of the target sound source from the audio signal currently received by the microphone array. Subsequently, the gain of the extracted audio component can be amplified according to the user-defined multiple, while the gain of other unextracted audio components can be reduced or turned off, so as to highlight the target sound source and weaken the non-target sound sources.

Step S150, outputting an enhanced audio signal to the wearer of the AR glasses through an in-ear headphone.

The speaker or audio interface of the AR glasses is located at the temple near the ear when worn normally. When using the above audio enhancing method of the embodiment of the present disclosure, the speaker needs to be pulled out to become an in-ear headphone for wearing, or is connected with an external dual-channel in-ear headphone via an audio interface for wearing.

In the Step S150, to better capture the sound of the sound source they are focusing on in the real world, the wearer of AR glasses needs to isolate the ambient noise and cannot directly listen to the sound played by the speakers through their ears. Instead, they must listen to the processed audio signals from the microphone array through in-ear headphones, thereby achieving enhanced directional audio.

From the description of the above steps, it can be seen that for the noisy environment with a plurality of sound sources in the real world, the audio enhancing method for AR glasses of the embodiment of the present disclosure, by optimizing and amplifying the sound of the sound source in the area near the eye gazing direction of the wearer of the AR glasses so as to suppress or eliminate the sound from other sound sources. This enhances the directional audio, assisting the wearer of the AR glasses in better acquiring the sound of the sound source they are paying attention to and reduce the interference from other sound sources, which provides a certain noise reduction effect, improves the user experience of the wearer of the AR glasses, and truly realizes the augmented reality function of AR glasses.

Figure 14:
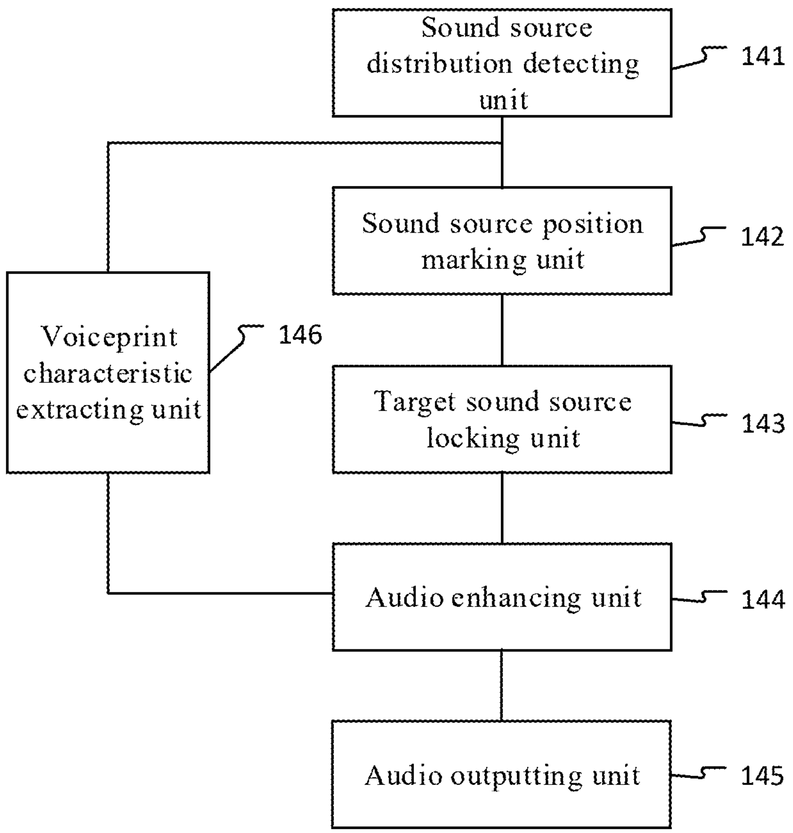
FIG. 14 is a structural schematic diagram of an audio enhancing device for AR glasses provided by an embodiment of the present disclosure.

Belonging to the same technical concept as the above method, the embodiment of the present disclosure also provides an audio enhancing device for AR glasses. FIG. 14 is a structural schematic diagram of an audio enhancing device for AR glasses provided by an embodiment of the present disclosure. As shown in FIG. 14, the audio enhancing device for AR glasses of the embodiment of the present disclosure includes:

- a sound source distribution detecting unit 141 configured for using a microphone array to detect distribution of sound sources in real world around a wearer of the AR glasses;
- a sound source position marking unit 142 configured for marking a position of each detected sound source on lenses of the AR glasses;
- a target sound source locking unit 143 configured for locking onto a target sound source based on an eye gazing direction of the wearer of the AR glasses;
- an audio enhancing unit 144 configured for extracting and enhancing an audio component associated with a voiceprint characteristic of the target sound source from an audio signal received by the microphone array;
- an audio outputting unit 145 configured for outputting an enhanced audio signal to the wearer of the AR glasses through an in-ear headphone.

In some embodiments, the above sound source distribution detecting unit 141 is specifically configured for:

when the wearer of the AR glasses is at a first position, obtaining a first direction line for each detected sound source according to sound signals of different intensities picked up by each microphone in the microphone array; when the wearer of the AR glasses is at a second position, obtaining a second direction line for each detected sound source according to sound signals of different intensities picked up by each microphone in the microphone array; and determining a position of each detected sound source according to a position of an intersection point of the first direction line and the second direction line for each detected sound source.

In some embodiments, the above sound source position marking unit 142 is specifically configured for:

establishing a world coordinate system with a head center of the wearer of the AR glasses as a coordinate origin, and determining a coordinate of each detected sound source in the world coordinate system; establishing a camera coordinate system with a pupil of the wearer of the AR glasses as a coordinate origin, and converting the coordinate of each detected sound source in the world coordinate system into a coordinate in the camera coordinate system according to a conversion formula obtained from a camera calibration algorithm; and marking a coordinate of each detected sound source in the camera coordinate system on the lenses of the AR glasses.

In some embodiments, the above target sound source locking unit 143 is specifically configured for:

using an eye tracker to obtain the eye gazing direction of the wearer of the AR glasses and converting the eye gazing direction into a coordinate in the camera coordinate system; when a distance between the eye gazing direction and a coordinate of a sound source in the camera coordinate system is less than a preset distance value, determining the sound source as the target sound source; distinctly marking the target sound source on the lenses of the AR glasses using a second marking method different from the first marking method, thereby locking onto the target sound source.

In some embodiments, as shown in FIG. 14, the audio enhancing device for AR glasses of the embodiment of the present disclosure may further include:

a voiceprint characteristic extracting unit 146 configured for extracting voiceprint characteristics for each sound source detected by the sound source distribution detecting unit 141 separately, and associating the voiceprint characteristics with corresponding sound source positions to establish a voiceprint database.

In some embodiments, the above audio enhancing unit 144 is specifically configured for:

looking up the voiceprint database to obtain a voiceprint characteristic of the target sound source according to the coordinate of the target sound source in the camera coordinate system; extracting an audio component associated with the voiceprint characteristics of the target sound source from an audio signal currently received by the microphone array; and amplifying a gain of the extracted audio component, and/or reducing or turning off a gain of other unextracted audio components.

The implementation process of each module or unit in the audio enhancing device for AR glasses of the embodiment of the present disclosure can refer to the aforementioned method embodiment, and will not be repeated herein.

Figure 15:
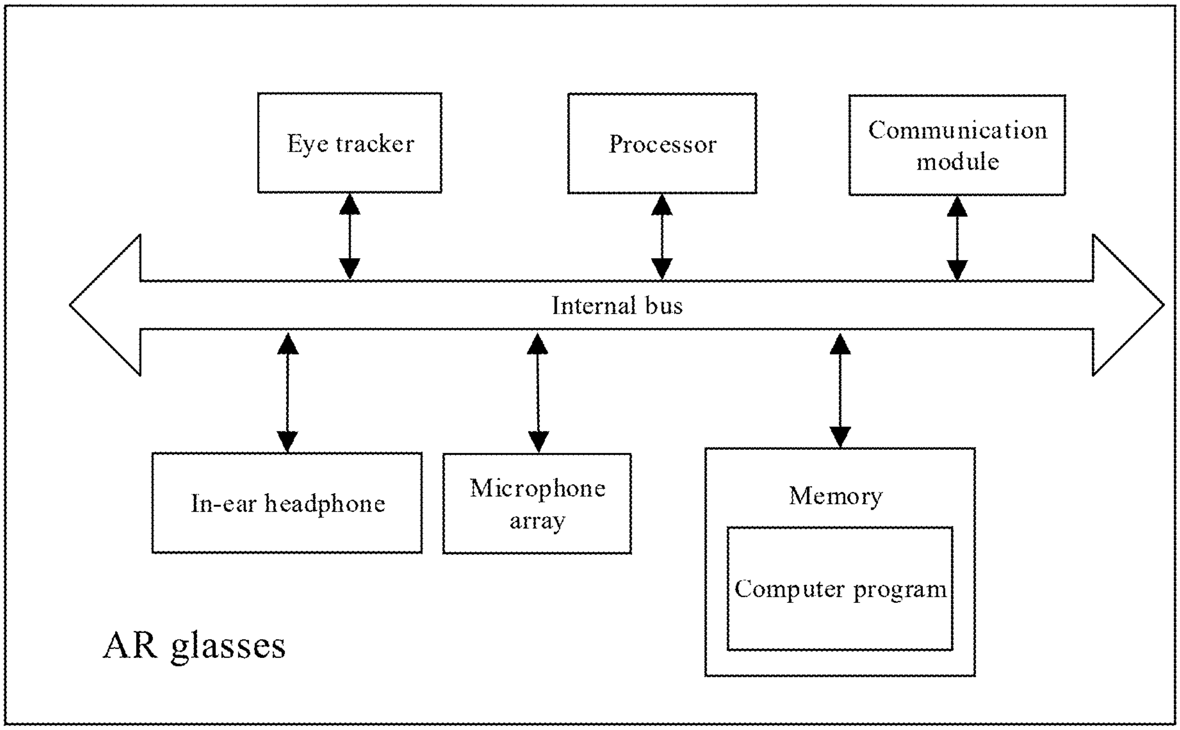
FIG. 15 is a structural schematic diagram of functional modules of AR glasses provided by an embodiment of the present disclosure.

Belonging to the same technical concept as the aforementioned audio enhancing method for AR glasses, the embodiment of the present disclosure also provides an AR glasses. FIG. 15 is a structural schematic diagram of functional modules of AR glasses provided by an embodiment of the present disclosure. Referring to FIG. 15, the AR glasses provided by the embodiment of the present disclosure include: a microphone array, an eye tracker, an in-ear headphone, a memory and a processor. Herein, the memory can be an internal memory, such as a high-speed random-access memory (RAM), or a non-volatile memory, such as at least one disk memory. The memory stores computer programs therein, which are loaded and executed by the processor to implement the proceeding audio enhancing method for AR glasses.

At the hardware level, the AR glasses may optionally include a communication module, etc. The speaker, in-ear headphone, microphone array, eye tracker, memory, processor, and communication module can be interconnected through an internal bus, which can be an ISA (Industry Standard Architecture) bus, a PCI (Peripheral Component Interconnect) bus, or an EISA (Extended Industry Standard Architecture) bus, etc. The bus can be divided into an address bus, a data bus, a control bus, etc. For ease of representation, only one bidirectional arrow is used in FIG. 15, but it does not mean that there is only one bus or one type of bus.

Finally, embodiments of the present disclosure also proposes a readable storage medium storing one or more computer programs, the one or more computer programs, when executed by a processor, implementing the proceeding audio enhancing method for AR glasses.

The readable storage medium includes both permanent and non-permanent, as well as removable and non-removable media, and can be implemented by any method or technology for storing information. The information can be computer-readable instructions, data structures, program modules, or other data. Examples of readable storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory, or other memory technologies, compact disc read-only memory (CD-ROM), digital versatile disc (DVD) or other optical storage, magnetic cassettes, magnetic tape, magnetic disk storage, or other magnetic storage devices, or any other non-transmission medium that can be used to store information accessible by a computing device.

Those skilled in the art will understand that the solutions provided by the present disclosure can be offered as a method, device, or computer program product. Therefore, the present disclosure may take the form of a complete hardware embodiment, a complete software embodiment, or an embodiment combining software and hardware. Furthermore, the present disclosure can be embodied in the form of a computer program product implemented on one or more computer-readable storage media containing computer programs.

It should be further noted that the terms "comprise", "contain", or any other variation thereof, are intended to cover a non-exclusive inclusion, such that a process, method, article, or apparatus that comprises a list of elements does not include only those elements but may include other elements not expressly listed, or elements inherent to such process, method, commodity, or apparatus. Without further restrictions, an element qualified by the statement "including a . . . " does not exclude the existence of another identical element in the process, method, commodity, or apparatus comprising the element.

The above are only embodiments of the present disclosure, and are not intended to limit the present disclosure. For those skilled in the art, several modifications and changes can be made in the present disclosure. Any modifications, equivalent replacements, improvements, etc., made within the spirit and principle of the present disclosure shall be included in the scope of the claims of the present disclosure.

The invention claimed is:

1. An audio enhancing method for AR glasses worn by a user in a surrounding environment, comprising:
detecting a distribution of sound sources in the surrounding environment using a microphone array;
marking a position of each sound source in the distribution of sound sources on lenses of the AR glasses;
locking onto one of the distribution of sound sources as a target sound source based on an eye gazing direction of the user;
extracting and enhancing an audio component associated with a voiceprint characteristic of the target sound source from an audio signal received by the microphone array, configured to obtain an enhanced audio signal; and
outputting the enhanced audio signal to the user through an in-ear headphone;
wherein the marking a position of each sound source in the distribution of sound sources on lenses of the AR glasses comprises:
establishing a world coordinate system with a head center of the user as a coordinate origin thereof, and determining a coordinate of each of the sound sources in the world coordinate system;
establishing a camera coordinate system with a pupil of the user as a coordinate origin thereof, and converting the coordinate of each of the sound sources in the world coordinate system into a first coordinate of each of the sound sources in the camera coordinate system according to a conversion formula obtained from a camera calibration algorithm; and
marking the first coordinate of each of the sound sources in the camera coordinate system on the lenses of the AR glasses.

2. The method according to claim 1, wherein the detecting a distribution of sound sources in the surrounding environment using a microphone array comprises:
when the user is at a first position, obtaining a first direction line for each sound source according to sound signals of different intensities picked up by each microphone in the microphone array;
when the user is at a second position, obtaining a second direction line for each sound source according to sound signals of different intensities picked up by each microphone in the microphone array; and
determining a position of each sound source according to an intersection point of the first direction line and the second direction line for each sound source.

3. The method according to claim 1, wherein the locking onto one of the distribution of sound sources as a target sound source based on an eye gazing direction of the user comprises:
determining the eye gazing direction of the user using an eye tracker and converting the eye gazing direction into a second coordinate in the camera coordinate system;
when a coordinate distance between the eye gazing direction and a sound source of the distribution of sound sources in the camera coordinate system is less than a preset distance value, locking onto the sound source as the target sound source; and
distinctly marking the target sound source on the lenses of the AR glasses to lock onto the target sound source.

4. The method according to claim 1, further comprise: extracting voiceprint characteristics for each detected sound source separately, and associating the voiceprint characteristics with corresponding sound source positions to establish a voiceprint database.

5. The method according to claim 4, wherein the extracting and enhancing an audio component associated with a voiceprint characteristic of the target sound source from an audio signal received by the microphone array comprise:
looking up the voiceprint database to obtain a voiceprint characteristic of the target sound source according to the first coordinate of the target sound source in the camera coordinate system;
extracting an audio component associated with the voiceprint characteristics of the target sound source from an audio signal currently received by the microphone array; and
amplifying a gain of extracted audio components, and/or reducing or turning off a gain of unextracted audio components.

6. An AR glasses, comprising a microphone array, an eye tracker, an in-ear headphone, a memory, and a processor, wherein the memory stores computer programs, which are loaded and executed by the processor to implement the audio enhancing method for AR glasses according to claim 1.

7. A non-transitory computer readable storage medium storing one or more computer programs configured to be executed by a processor to implement the audio enhancing method for AR glasses according to claim 1.

8. An audio enhancing device for AR glasses worn by a user in a surrounding environment, comprising:
a sound source distribution detecting unit configured for detecting a distribution of sound sources in the surrounding environment of the user a microphone array;
a sound source position marking unit configured for marking a position of each sound source in the distribution of sound sources on lenses of the AR glasses, wherein the marking a position of each sound source in the distribution of sound sources on lenses of the AR glasses comprises:
establishing a world coordinate system with a head center of the user as a coordinate origin thereof, and determining a coordinate of each sound source in the world coordinate system;
establishing a camera coordinate system with a pupil of the user as a coordinate origin thereof, and converting the coordinate of each sound source in the world coordinate system into a first coordinate of each sound source in the camera coordinate system according to a conversion formula obtained from a camera calibration algorithm; and
marking the first coordinate of each sound source in the camera coordinate system on the lenses of the AR glasses;
a target sound source locking unit configured for locking onto one of the distribution of sound sources based on an eye gazing direction of the user;
an audio enhancing unit configured for extracting and enhancing an audio component associated with a voiceprint characteristic of the target sound source from an audio signal received by the microphone array to obtain an enhanced audio signal; and
an audio outputting unit configured for outputting the enhanced audio signal to the user through an in-ear headphone.

9. The device according to claim 8, wherein the device further comprises:

a voiceprint characteristic extracting unit configured for extracting voiceprint characteristics for each sound source detected by the sound source distribution detecting unit separately, and associating the voiceprint characteristics with corresponding sound source positions to establish a voiceprint database.

* * * * *